Nov. 11, 1924.　　　　　　　　　　　　　　　　1,515,559
C. J. EDWARDS
ANIMAL TRAP
Filed Oct. 14, 1920

Inventor
C. J. Edwards.
Attorney

Patented Nov. 11, 1924.

1,515,559

UNITED STATES PATENT OFFICE.

CHARLES J. EDWARDS, OF MARSHALL, MISSOURI.

ANIMAL TRAP.

Application filed October 14, 1920. Serial No. 416,843.

*To all whom it may concern:*

Be it known that I, CHARLES J. EDWARDS, a citizen of the United States, residing at Marshall, in the county of Saline and State of Missouri, have invented certain new and useful Improvements in Animal Traps; and I do hereby declare the following to be a full, clear, and exact description of the invention, such as will enable others skilled in the art to which it appertains to make and use the same.

This invention relates to an animal trap, and the object is to produce a device of the character indicated which shall include a runway, preferably open at both ends, a bait receptacle within the runway, and a cage portion into which the animal passes after entering the runway, suitable doors being provided, preventing the animal from emerging after having once entered.

A further object is to provide, in connection with a suitable housing or box, providing a runway and a cage portion, a plurality of swinging doors closing the opposite ends of the runway and permitting of entrance only, a bait receptacle, and means controlling an opening from the runway to the cage portion.

A still further object is to provide a trap which shall include a housing or box having a slidable or removable cover portion and formed with a longitudinal partition providing a runway and a cage portion, means controlling the opposite end opening or entrance portion just after the runway, a bait receptacle positioned at a point intermediate with the ends of the runway, and means controlling an opening from the runway to the cage portion.

With the foregoing and other objects in view, the invention consists in the novel construction, combination and arrangement of elements hereinafter described and claimed.

Figure 1:
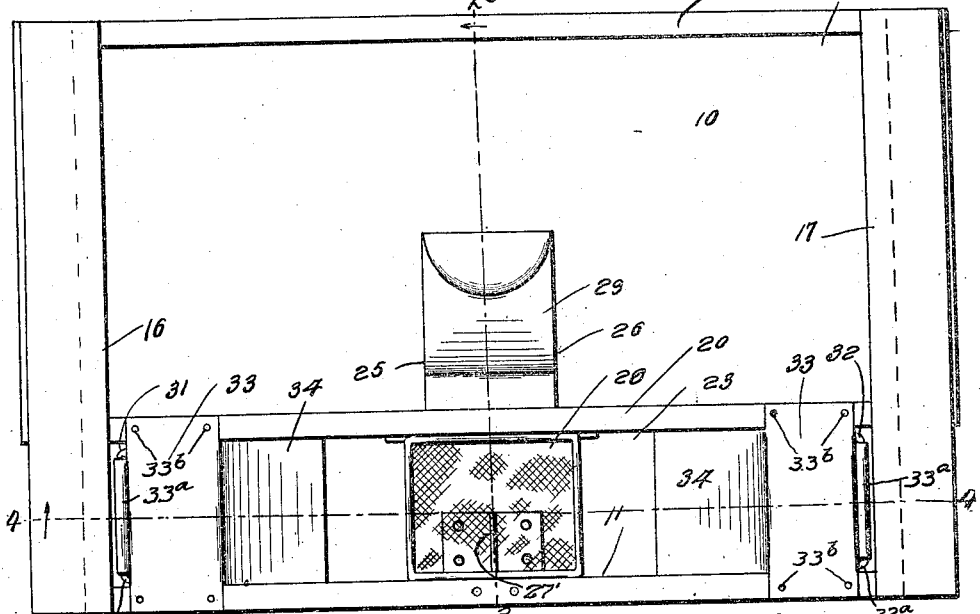
Figure 1 is a top plan view of the device, with the cover portion removed.
Figure 2:
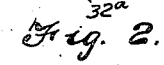
Figure 2 is a vertical transverse section through the complete device on line 2—2 of Figure 1.
Figure 4:
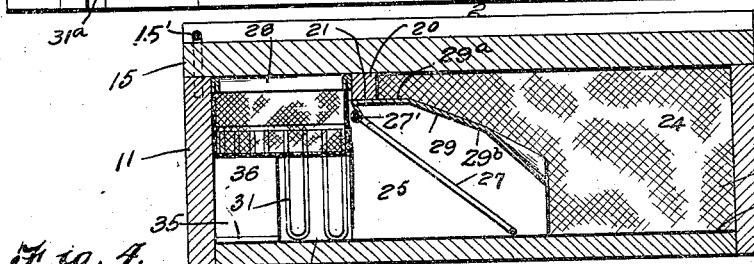
Figure 4 is a vertical longitudinal section on line 4—4 of Figure 1.
Figure 3:
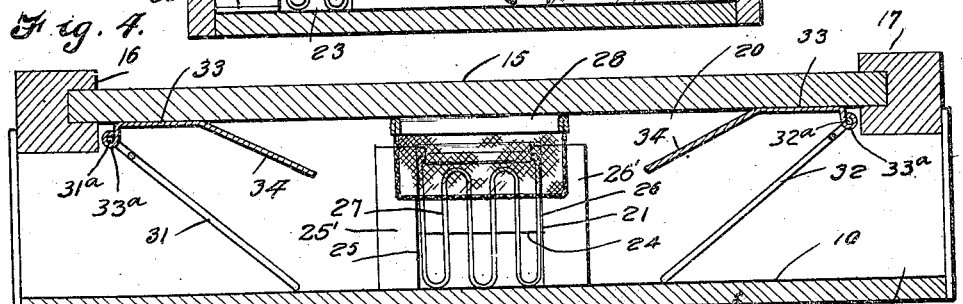
Figure 3 is an end elevation.

In carrying out my invention, I provide a housing or box portion including the bottom element 10, the longitudinal side portions 11 and 12, and end portions formed as indicated below.

A cover 15 is slidable with reference to the grooved transverse members 16 and 17 each constituting an element of the end of the trap, and the cage portion of the trap is closed at the ends thereof by means of wire mesh 18. The cover is provided with openings through which a staple or the like 15′ may be passed to enter registering openings in the end wall 11 of the cage portion of the trap, to the end that the cover may be readily fastened in place and may be released by moving the staple upward out of the openings in the end wall 11 and sliding the same in the grooved transverse members 16 and 17.

A longitudinal partition 20 is provided with a central opening 21 and forms a runway 23 and a cage portion 24 having communication through the aforesaid opening. Extending into the cage portion is an entrance device including a hood or housing 29 comprising side portions 25 and 26 of sheet metal, and a door or the like 27, mounted within the opening 21 as shown, and permitting an animal to enter the cage portion from the runway, but preventing the animal from returning to the runway. The side portions of this device extend through the opening 21 in the partition 20 and are then laterally deflected to form flanges 25′ and 26′ which are secured to the partition per se in any suitable manner.

A reticulate bait receptacle 28 is mounted in the runway, above the bottom thereof and opposite the opening through the partition, and it should be added that the hingedly mounted door 27 controlling the opening through the partition is formed with a hood 29, generally of U-shape in cross section comprising a front portion 29$^a$ attached to partition 20 and being deflected downwardly therefrom as at 29$^b$ to provide a restricted escape opening.

A plurality of hinged doors 31 and 32 are mounted respectively at the ends of the runway, or near the ends, the doors being of open work construction, for obvious reasons. Over each of the doors in the runway is a cover plate including a flat portion 33 to which doors 31 and 32 are pivoted at 31$^a$ and 32$^a$, respectively. Said cover plates are connected with the upper walls of the runway, and the cover further includes a downwardly inclined portion 34 projecting inwardly over the door mounted immediately below this element.

It will be understood that the animal entering the trap can pass into the runway from either end, being attracted by the smell of the bait, and being unable to actually reach the bait within the metallic receptacle 28, will pass under the latter, and through the doorway formed in the partition, lifting the hinge door 27 and entering the cage portion, in which bait may also be placed, so that the tendency will be for the animal to move continuously until entering the cage.

Positioned beneath the base of receptacle 28 and in supporting relation thereto is the guide member 35 including the base portion 36 and the upright plate 27' which extends upwardly and engages the under side of the bait receptacle. A rat or other animal entering the trap will when passing the guide member 35 have his attention directed to the opening 25 through which he passes to the cage 24 where he is imprisoned until the operator of the trap empties the same.

In actual use this devicec has proved to be extremely effective in operation, and although I have described the construction somewhat in detail, I do not wish to be limited to minor features having no important bearing upon the operation, but may make changes or alterations within the scope of the appended claim.

What is claimed is:—

A trap comprising a hollow rectangular member, a vertical partition therein in close proximity to one of the vertical walls thereof to provide a captive chamber and a runway and having an opening establishing communication between said chamber and runway, a door carried by said partition and extending across said opening, a plate secured to the upper edges of said partition and adjacent the vertical wall and provided at one side with a hinge barrel extending into the runway and at its other side with a downwardly and inwardly extending stop located in the runway, a door connected to said hinge barrel and extending downwardly and inwardly therefrom, said stop being positioned above the door and adapted to limit the upward swinging movement thereof.

In testimony whereof I affix my signature in presence of two witnesses.

CHARLES J. EDWARDS.

Witnesses:
 EUGENE S. CARTER,
 D. H. RYAN.